Sept. 30, 1969  SABURO YAMAUCHI ET AL  3,469,372
HYDROGEN PERMEABLE MEMBRANE AND HYDROGEN PERMEATING ASSEMBLY
Filed June 13, 1966  4 Sheets-Sheet 1
Fig. 1
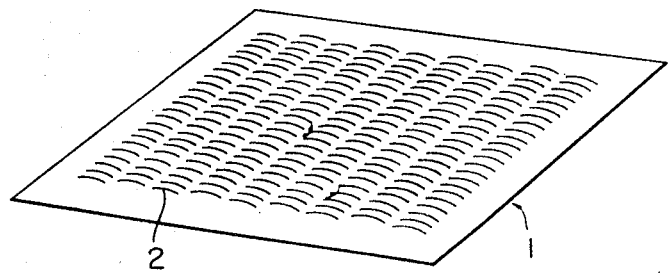
Fig. 2-A
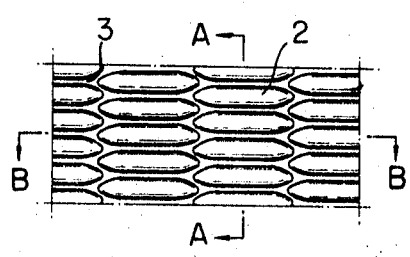
Fig. 2-B
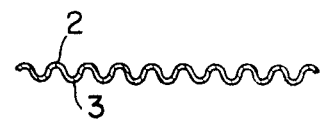
Fig. 2-C
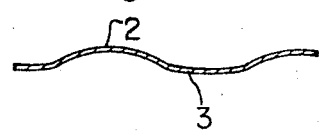
Fig. 3
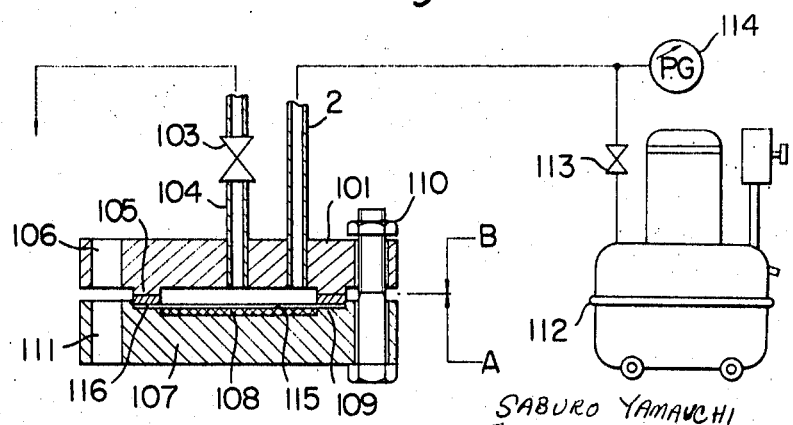
SABURO YAMAUCHI,
TERUCHIKA TAURA,
YUZURU ISOGAI AND HIDEKI SEINO
INVENTORS
BY
ATTORNEYS Sept. 30, 1969 SABURO YAMAUCHI ET AL 3,469,372
HYDROGEN PERMEABLE MEMBRANE AND HYDROGEN PERMEATING ASSEMBLY
Filed June 13, 1966 4 Sheets-Sheet 2
Fig. 4
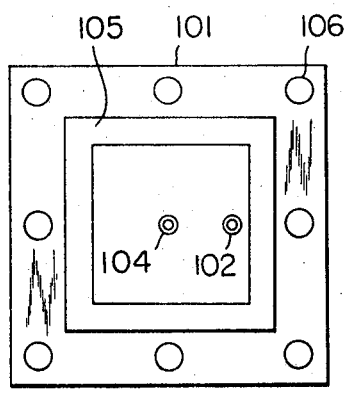
Fig. 5
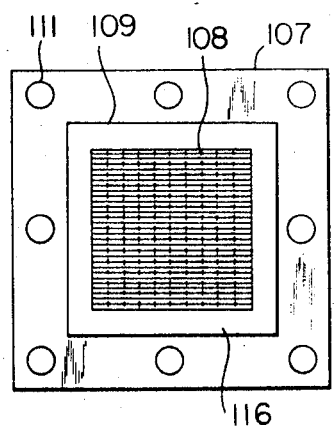
Fig. 6-A
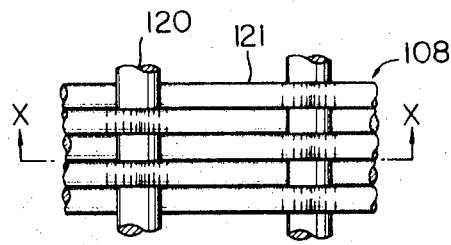
Fig. 6-B
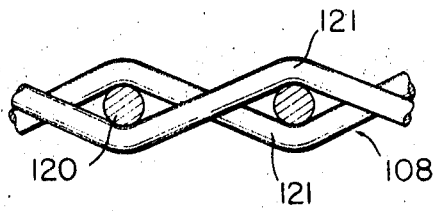
SABURO YAMAUCHI,
TERUCHIKA TAURA,
YUZURU ISOGAI AND
HIDEKI SEINO
INVENTORS
BY Wenderoth, Lind
and Ponack ATTORNEYS

Fig. 7-A
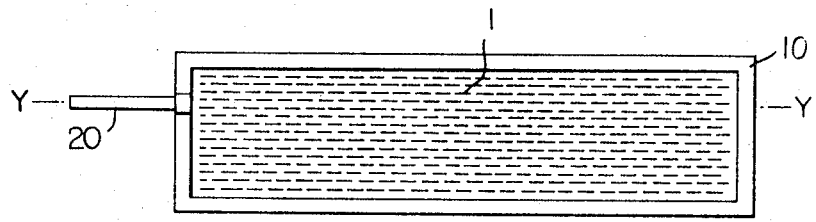
Fig. 7-B
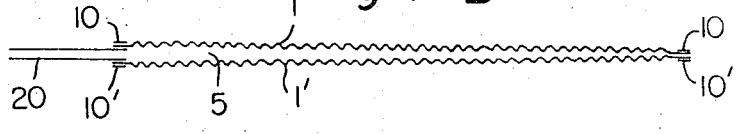
Fig. 7-C
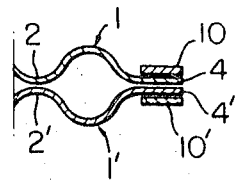
Fig. 8-A
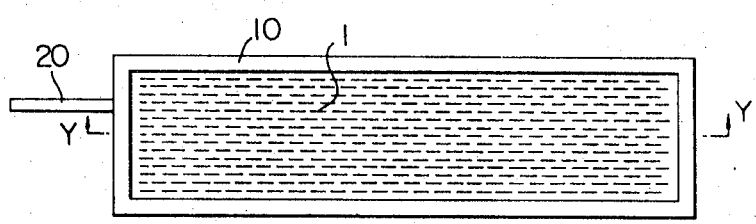
Fig. 8-B
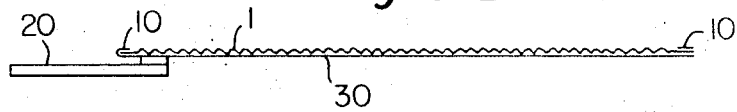
Fig. 8-C
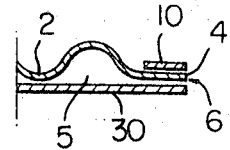

Sept. 30, 1969   SABURO YAMAUCHI ET AL   3,469,372
HYDROGEN PERMEABLE MEMBRANE AND HYDROGEN PERMEATING ASSEMBLY
Filed June 13, 1966                           4 Sheets-Sheet 4
Fig. 9-A
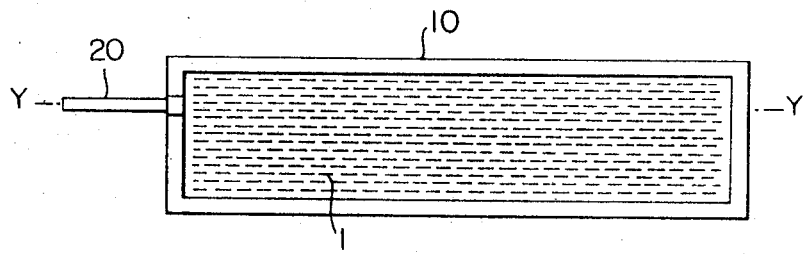
Fig. 9-B
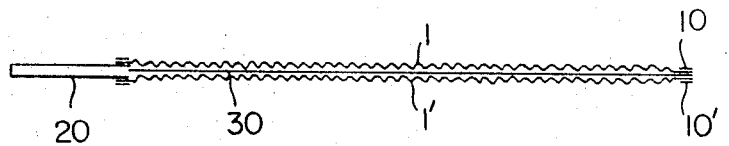
Fig. 9-C
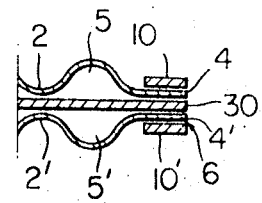
SABURO YAMAUCHI,
TERUCHIKA TAURA,
YUZURU ISOGAI AND
HIDEKI SEINO INVENTORS
BY *Wenderoth, Lind*
*and Ponack* ATTORNEYS

United States Patent Office 3,469,372
Patented Sept. 30, 1969

3,469,372
HYDROGEN PERMEABLE MEMBRANE AND HYDROGEN PERMEATING ASSEMBLY
Saburo Yamauchi and Teruchika Taura, Tokyo, and Yuzuru Isogai and Hideki Seino, Yokohama, Japan, assignors to Japan Gas-Chemical Company, Inc., Tokyo, Japan
Filed June 13, 1966, Ser. No. 557,078
Claims priority, application Japan, June 18, 1965, 40/35,955; Sept. 13, 1965, 40/55,989
Int. Cl. B01d 13/00
U.S. Cl. 55—158      9 Claims

ABSTRACT OF THE DISCLOSURE

A hydrogen permeable membrane composed of a palladium or a palladium alloy, the surface of the membrane having a wavy configuration as a result of being stamped with the surface of a plain dutch weave wire netting of 20 to 200 meshes.

---

This invention relates to a new hydrogen permeable membrane and hydrogen permeating assembly. More particularly, this invention relates to a durable hydrogen permeable membrane whose hydrogen peremability is great, to a hydrogen permeating assembly using said hydrogen permeable membrane and to a method of manufacturing said hydrogen permeable membrane and the assembly using said membrane.

A membrane of palladium alloy has been used heretofore for separating pure hydrogen gas from hydrogen containing impure gas. The hydrogen permeable membrane of palladium alloy permeates hydrogen at a temperature of 300-500° C., its capacity of permeating pure hydrogen being expressed by the following equation:

$$Q = K(1/t)\sqrt{P}e^{-Eo/RT}$$

wherein:
Q=permeating rate of hydrogen
K=rate constant of diffusion
$t$=thickness of the metallic membrane
P=primary and secondary pressure differential
T=absolute tempertaure of the membrane
Eo=activated energy
R=gas constant Hence, the following characteristics are required to be possessed by a hydrogen permeable membrane:

(1) As the $H_2$ permeating rate is inversely proportional to the thickness of the memberane, the hydrogen permeation is increased as the thickness of the membrane becomes smaller.

(2) Since the $H_2$ permeating speed is proportional to the square root of the pressure differential between the primary and secondary sides and hence the hydrogen permeation increases as the pressure of the material gas becomes higher, the membrane must be highly pressure resistant.

(3) The palladium alloy membrane is heated to 300–450° C. when used for permeating $H_2$, and thus the membrane must be able to withstand the expansion and contraction which results from the heat.

(4) If such defects as cracks and scratches are present in the $H_2$ permeable membrane, the membrane will be damaged by either the expansive or contractile force due to the difference in temperature or the difference in the pressure between the primary and secondary sides to cause the impure gas to leak into the secondary side (the pure hydrogen side). Hence, the membrane must be without such defects as cracks and scratches.

A hydrogen permeable membrane which satisfies these requirements has however not been known heretofore. For instance, the conventional hydrogen permeable tubes which are produced by either the sinking or extruding processes are susceptible to sinking scratches longitudinally of the tubes, and as a result they have the shortcoming that these scratches are responsible for cracks occuring in the tubes. Further, it is exceedingly difficult to discover these sinking scratches with certainty. On the other hand, the hydrogen permeable tubes which have been manufactured by welding have the defects that their thickness becomes nonuniform, breakage occurs due to processing wrinkles and scratches, or bending occurs when heated. Further, in the case where the hydrogen permeable tube is to be made by the drawing process, there is required the complicated operation of starting with a mild draw and gradually drawing severely to form the tube. The hydrogen permeable tubes manufactured by any of the foregoing processes had numerous defects in the tube wall when the thickness of the membrane was below 0.075 mm. and hence were such that they could not be used practically. That is to say, the conventional hydrogen permeable tubes were limited in their hydrogen permeating capacity.

On the other hand, the hydrogen permeating assembly consisting of a flat permeable membrane obtained by rolling, which was supported by a gas permeable supporting member, had the drawback that wrinkles would form in the membrane due to the difference in thermal expansion between the membrane and the supporting member during elevated temperatures, in consequence of which cracks would form as a result of these wrinkles upon repetition of the heating and cooling of the membrane.

An object of this invention is to provide a thin, hydrogen permeable membrane which does not possess such defects as cracks and scratches of its surface as will become the cause of its breakage, which can withstand the expansion and contraction due to high differences in temperature as well as a high pressure differential, and moreover whose hydrogen permeating capacity is exceedingly great.

Another object of the invention is to provide a method of manufacturing at low cost and without the need for complicated operations, a hydrogen permeable membrane having durability as well as a great hydrogen permeating capacity.

A further object of this invention is to provide a method of fabricating a hydrogen permeating assembly using the hereinbefore described hydrogen permeable membrane to provide an assembly excelling in durability as well as its capacity to produce pure hydrogen.

Other objects and advantages of this invention will become apparent from the following description.

The foregoing objects are achieved according to this invention by a hydrogen permeable membrane comprising a 0.3 to 0.005 mm. thick membrane of a metal selected from the group consisting of palladium and its alloys, which is characterized in that said membrane has a plurality of convexed portions protruding in the direction of the thickness of the membrane and netlike concaved portions surrounding said convexed portions, said membrane being of way configuration longitudinally as well as laterally thereof.

The hydrogen permeable membrane according to this invention usually has a thickness of 0.3 to 0.005 mm., and preferably from 0.1 to 0.01 mm. A membrane whose thickness exceeds 0.1 mm., and especially 0.3 mm., is not desirable for reasons that not only the amount of hydrogen permeating is decreased but also the cost of production of such a thick membrane becomes high. On the other hand, a thickness of less than 0.1 mm., and especially 0.005 mm., is undesirable as the durability of the membrane is unsatisfactory. Either metallic palladium or a palladium alloy will do for the material of which the membrane is made. In view of the fact that the material gas corrodes metallic palladium, preferred is an alloy of palladium with a noble metal such as silver or gold, and especially preferred is an alloy of the three elements of palladium, silver and gold.

In a still more specifically suitable embodiment of the invention, the aforesaid hydrogen permeable membrane comprises a 0.3 to 0.005 mm. thick membrane of a metal selected from the group consisting of palladium and palladium alloys, and said membrane moreover has a wavy surface substantially coinciding with the surface of a plain dutch weave wire netting of 40 to 200 meshes.

The term "mesh" as hereinafter used is meant to be the number of warps per inch length of a wire netting.

For a better understanding of this invention, reference will be had to the accompanying drawings, wherein:

FIG. 1 is perspective view illustrating in rough the hydrogen permeable membrane of this invention;

FIG. 2–A is a plan view partly magnified of the invention hydrogen permeable membrane, FIG. 2–B being a sectional view taken along line A—A of FIG. 2–A, while FIG. 2–C is a sectional view taken along line B—B of FIG. 2–A;

FIG. 3 is a schematic view of a hydraulic stamping apparatus for manufacturing the invention hydrogen permeable membrane, the stamper proper being shown in section;

FIG. 4 is a plan view of the upper matrix of the stamper of FIG. 3, as seen from A;

FIG. 5 is a plan view of the lower matrix of the stamper of FIG. 3, as seen from B;

FIG. 6–A is a plan view partly magnified of a plain dutch weave wire netting to be used in the method of manufacturing the invention hydrogen permeable membrane, FIG. 6–B being a sectional view partly magnified taken along line X—X of FIG. 6–A;

FIG. 7–A is a plan view of an embodiment of the invention illustrating a hydrogen permeating assembly, FIG. 7–B being a sectional view taken along line Y—Y of FIG. 7–A, while FIG. 7–C is an enlarged view illustrating the end portion of the assembly of FIG. 7–B;

FIG. 8–A is a plan view of another embodiment of the invention hydrogen permeating assembly, FIG. 8–B being a sectional view taken along line Y—Y of FIG. 8–A, while FIG. 8–C is an enlarged view showing the end portion of the assembly of FIG. 8–B; and FIG. 9–A is a plan view illustrating a still another embodiment of the invention assembly, FIG. 9–B being a sectional view taken along line Y—Y of FIG. 9–A, while FIG. 9–C is an enlarged view showing the end portion of the assembly shown in FIG. 9–B.

Referring to FIGS. 1, 2–A, 2–B and 2–C, a hydrogen permeable membrane 1, according to this invention, has an unevenly figured surface composed of convexities 2 and concavities 3, which have been stamped and figured with, say, a plain dutch weave wire netting. It is preferable that the convexities 2 engage with each other in a longitudinal as well as lateral direction, and are arranged with their positions out of place each by half a pitch. Concavities 3 surround the convexities 2 and thus are present in net fashion about the latter. It is preferable that the net-like concavities 3, in any direction of the surface, do not intersect the surface of the membrane in a linear fashion, but always traverse the surface in a zig-zag fashion. As is apparent from FIGS. 2–B and 2–C, the hydrogen permeable membrane of this invention is made up of a wavy configuration consisting of convexities 2 and concavities 3, in both the longitudinal as well as lateral direction of the membrane. This wavy configuration appears when the surface is cut in an optional direction except that there exists a slight difference in the pitch of the waves depending upon the direction.

Thus, since the invention hydrogen permeable membrane possesses small wavy figures in all directions including the longitudinal as well as lateral directions, it moderates to a very satisfactory degree the expansion and contraction due to heat or difference in pressure, and hence possesses great durability. There is also the advantage that the circulation of the hydrogen permeated is very easy as a result of the presence of numerous netlike grooves longitudinally as well as laterally of the invention membrane.

Further, although of the limit in the thickness with which the known hydrogen permeable tubes could be made was 0.075 mm., the invention permeable membrane can be made exceedingly thin. Hence, the amount of hydrogen permeated per unit area becomes several times to tenfold thereof that of the former. In addition, the amount of noble metals used for the manufacture of the invention hydrogen permeable membrane can be reduced to a fraction of the former.

The invention hydrogen permeable membrane can be manufactured by placing a 0.3 to 0.005 mm. thick flat membrane of metal selected from the group consisting of palladium and palladium alloys, atop a 20 to 200 mesh plain dutch weave wire netting fitted to a supporting plate, and then compressing the flat membrane from above by a pressure medium. The so formed membrane has on its surface a wavy configuration which substantially coincides with the surface of the 20 to 200 mesh plain dutch weave wire netting.

The mesh size of the plain dutch weave wire netting that is used is preferably varied in accordance with the thickness of the flat membrane that is to be used. In a preferred mode of this invention, a wire netting of 50 to 100 meshes is used when the thickness of the metallic membrane is 0.1 to 0.05 mm. On the other hand, when the thickness of the metallic membrane is 0.05 to 0.01 mm., a wire netting of 100 to 200 meshes is used.

As the pressure medium, either rubber, oil or water can be used. The pressure used in forming the membrane will vary depending upon the thickness and the material used as the flat membrane, but it is in general preferably from 100 to 450 kg./cm.$^2$.

An important feature of this invention is that a plain dutch weave wire netting is employed as a die. Namely, (1) the plain dutch weave wire netting has the advantage that it can withstand compression better than a wire netting of any of the other types of weave and thus it is not deformed; (2) the surface of this wire netting is much smother than any of the other types, since it is made by weaving drawn metallic wire having a very smooth surface, in consequence of which a flawless hydrogen permeable membrane can be made because the membrane does not become easily cracked or scratched during its formation; (3) hydrogen permeable membranes having wavy configurations of varying pitches ranging from undulations of large pitch to those of small pitch can be easily manufactured, as desired, from a single matrix by just changing the wire netting to one having a different mesh; and (4) the manufacture of a hydrogen permeable membrane having a configuration of minute waves on its surface in the longitudinal, lateral as well as diagonal directions, which had hitherto been impossible to make by the conventional machining operations, has been made possible by the use of a very inexpensive plain dutch weave wire netting as a die.

Referring to the accompanying drawings, a mode of practicing this invention will be illustrated. In FIG. 3 there is illustrated a schematic view of a hydraulic stamping apparatus and a front elevation in section of a stamper for manufacturing the hydrogen permeable membrane of this invention. As shown in FIGS. 3 and 4, the upper matrix of the stamper consists of a square flange 101 in which are provided a hydraulic fluid inlet tube 102, an air vent 104 fitted with an air vent valve 103, a raised packing pressing ridge 105, and bolt holes 106 in the perimeter thereof.

The lower matrix of the stamper, as shown in FIGS. 3 and 5, consists of a square flange supporting member 107 in which, whose middle part which is indented, a plain dutch weave wire netting 108 is fitted, a packing groove 109 being disposed surrounding the indented part. Also bolt holes 111 are provided in the perimeter so as to make it possible to bolt the upper matrix to the lower matrix with bolts 110.

Hydraulic inlet tube 102 is connected to an outlet valve 113 of a hydraulic fluid pump 112, a pressure gauge 114 (0–600 kg./cm.$^2$) being connected in the line. Pump 112 can freely adjust the hydraulic pressure from 0 to 500 kg./cm.$^2$.

In the operation of preparing the hydrogen permeable membrane, first, as shown in FIG. 3, a rolled square palladium alloy membrane 115 is placed on the plain dutch weave wire netting 108 in the lower matrix so as to fit into the packing groove 109, after which a neoprene rubber packing 116 punched out in square shape is placed thereon. Next, the packing pressing ridge 105 of the upper matrix is positioned so as to fit over the packing 116, following which bolts 110 are inserted in the bolt holes 106, 111 of the upper and lower matrices and tightened evenly. Then the hydraulic fluid inlet tube 102 is connected with the hydraulic fluid pressure pump 112, and in a state in which the outlet valve 113 is open and the air vent valve 103 is closed, hydraulic pressure is applied to the primary side of the membrane by operating the pump, thereby compressing the membrane against the plain dutch weave wire netting. After suitably opening the air vent valve 103 to drive out the air from the matrices, the pressure is raised to the prescribed stamping pressure, whereupon the pump is stopped. After maintaining this state for 5 minutes, the pressure is released, the bolts 110 are removed, the upper and lower matrices separated, and the rubber packing 116 is removed. The resulting hydrogen permeable membrane 115 is then removed from the lower matrix, thoroughly removed of the hydraulic fluid and washed. This membrane can then be used for permeating hydrogen.

The plain dutch weave wire netting to be used in this invention, which is illustrated on a magnified scale in FIGS. 6–A and 6–B, is well known by this name. Those parts of warps 121 which are positioned above wefts 120 impart the convexities to the metallic membrane, whereas those parts of warps 121 which are positioned at the underside of wefts 120 impart the groove or concavities to the metallic membrane.

EXAMPLE 1

This example illustrates the advantages of using a plain dutch weave wire netting as the die in the present invention and also the superior pressure resistance of the so obtained invention hydrogen permeable membrane.

First of all, it was confirmed that no damage whatsoever occurred in a plain dutch weave wire netting though such wire nettings in mesh sizes of 50, 100 and 150 meshes were subjected intermittently for several hundred times to a stamping pressure of 500 kg./cm.$^2$.

Next, it was confirmed that in the case of the plain dutch weave wire netting, on account of its exceedingly smooth surface, cracks and damages did not easily occur to the membrane during its stamping, when compared with the other dies that were made by machining operations. Namely, when a comparison was made between the stamping obtained by using a die engraved with a 2 mm. pitch sine wave configuration in concentric circular fashion and that obtained by using a plain dutch weave wire netting fitted to the matrix, the results were as follows:

| Thickness of Pd alloy membrane, mm. | Form of die | Critical breakage pressure of membrane during stamping, kg./cm.$^2$ |
|---|---|---|
| 0.1 | Concentric circular wave die. | Cracked at 400 kg./cm.$^2$ |
| 0.05 | do | Cracked at 200 kg./cm.$^2$ |
| 0.03 | do | Cracked at 100 kg./cm.$^2$ |
| 0.1 | Plain dutch weave wire netting. | Cracked at above 500 kg./cm.$^2$ |
| 0.05 | do | Cracked at above 350 kg./cm.$^2$ |
| 0.03 | do | Cracked at above 250 kg./cm.$^2$ |

It was confirmed that in the case of the invention hydrogen permeable membrane it was possible by changing the plaint dutch weave wire netting to make the pitch of the waves both longitudinal as well as lateral very small and also to increase greatly the resistance to pressure of the membrane in its supported state.

For instance, the pressure resistance at room temperature of a 0.05 mm. thick membrane stamped employing as the die a plain dutch weave wire netting of 50 mesh (longitudinal pitch 1 mm., lateral pitch 3.2 mm.) was above 35 kg./cm.$^2$ while that of the 0.03 mm. thick palladium alloy membrane impressed with the plain dutch weave design was 15 kg./cm.$^2$.

When the foregoing wire netting was changed for one of 150 meshes, it was confirmed that the pressure resistance for an equal membrane thickness was raised further.

EXAMPLE 2

This example illustrates the fact that the invention hydrogen permeable membrane has excellent durability as well as excellent hydrogen permeating capacity.

A flat membrane of PdAgAu alloy rolled to a thickness of 0.05 mm. was stamped by the procedure hereinbefore described. An experiment was carried out which consisted in introducing commercial bombed hydrogen (99.7%) under a pressure of 10 kg./cm.$^2$ to the primary side of this membrane held in a supported state at a temperature of 450° C.±5° C., and removing permeated pure hydrogen under normal atmospheric pressure condition at the secondary side of the membrane. When the apparatus was disassembled and checked after having carried out the experiment for 8000 hours, it was confirmed that the membrane had not been deformed at all nor had there occurred any defects such as cracks in the membrane. Further, there was no change whatsoever in the amount of pure hydrogen permeated between the initial stage of operation and after 8000 hours.

Next, by way of comparison, an experiment was conducted to determine the amounts of pure hydrogen permeated by the hydrogen permeable membranes stamped from rolled membranes of 0.1, 0.5 and 0.03 mm. thickness, respectively, using the plain dutch weave wire netting, and the conventional welded and drawn tubes. The results obtained are shown below.

Conditions of experiment:
    Permeating temperature ____ 450° C.±5° C.
    Material gas _____ Commercial bombed $H_2$[1].
    Pure hydrogen side pressure __ Normal atmospheric pressure.

[1] $H_2$=99.7 percent.

Results of experiment:

| Type of hydrogen permeable membrane | Membrane Thickness (mm.) | Amount of hydrogen permeated according to the respective pressures of primary side [1] | | |
|---|---|---|---|---|
| | | 2 kg./cm.[2] | 6 kg./cm.[2] | 10 kg./cm.[2] |
| Invention membrane (thickness cfbore | | | | |
| Invention membrane (thickness before stamping). | 0.1 | 0.47 | 1.12 | 1.63 |
| | 0.05 | 0.78 | 2.01 | 3.00 |
| | 0.03 | 1.14 | 3.06 | 4.52 |
| Welded tube | 0.1 | 0.23 | 0.56 | 0.8 |
| Drawn tube | 0.075 | 0.3 | 0.74 | 1.06 |

[1] Liter per hour per unit surface area (cm.[2]) of the permeable material.

As is apparent from the results of the foregoing experiment, it was confirmed that, as contrasted with the drawn or welded tubes, the permeating capacity of the hydrogen permeable membrane of this invention was far greater, and hence it was possible to reduce greatly the amount of consumption of the noble metals.

According to this invention, the manufacture of hydrogen permeating assemblies which can be used in the direct separation of pure hydrogen is made possible by using the aforesaid hydrogen permeable membrane which excels in durability and has a great capacity for permeating hydrogen.

According to one mode of practicing this invention, a thin hydrogen permeating assembly is provided by a method which comprises overlying two sheets of the aforesaid hydrogen permeable membrane wiith their convexities facing each other, sandwiching the edges of the overlaid membranes with thin ribbonlike nickel sheets, providing a pure hydrogen take-out port communicating with the interior of the two overlaid membranes, then uniting the outer edges of the foregoing assembly integrally by welding and uniting the facing convexities of the two sheets of membrane by diffusion welding.

FIGS. 7–A and 7–B are respectively plan and sectional views of the hereinabove described thin hydrogen permeating assembly. Referring to these figures, the palladium alloy membranes 1 and 1' of, say, 0.05 mm. thickness, which have been stamped out according to this invention are overlaid with their convexities facing each other with a pure hydrogen take-out tube 20 being provided at one end of the hydrogen permeable membranes such as to communicate with a space 5 between the two membranes. Thin ribbonlike nickel sheets 10 and 10' of, say, a thickness of 0.2 mm. are disposed about edges 4 and 4' of the hydrogen permeable membranes sandwiching the latter, after which the layers of sheets are bound and their outer edge portions are united by welding preferably in an inert atmosphere.

Thereafter, the diffusion welding of the convexities 2 and convexities 2' of the two hydrogen permeable membranes is effected by heating the assembly at 400–700° C., holding it for 20 hours in a hydrogen atmosphere at a pressure of 0.02–1 kg./cm.[2] G, and permeating pure hydrogen into the inside 5 of the membranes.

In accordance with another mode of practicing the invention, a thin hydrogen premeating assembly is provided by a method which comprises overlaying hydrogen permeable membranes on a supporting member consisting of thin, nickel-plated sheets of a heat-resistant alloy whose linear co-efficient of expansion at 500° C. is less than $14 \times 10^{-6}$ (° C.)$^{-1}$ in a manner such that the convexities of the said membrane and the surface of the supporting member, overlaying thin ribbon-like nickel sheets on the edges of said overlaid membranes, providing pure hydrogen take-out port at the edge of said assembly communicating with the spaces formed by said membranes and supporting member, uniting the perimetric edge of said assembly integrally by welding, and uniting the convexities of said membranes with the supporting member by diffusion welding.

The hydrogen permeable membranes can be provided either on only one side of the supporting member or on both sides, one sheet of membranes being placed on each side of the supporting member in the latter case.

FIGS. 8–A, 8–B and 8–C illustrate a hydrogen permeating assembly wherein the hydrogen permeable membrane has been provided on only one side of the supporting member. On the other hand, FIGS. 9–A, 9–B and 9–C show a similar assembly except that the both sides of the supporting member are provided respectively with one sheet each of the membranes.

In these figures, 1 and 1' designate the hydrogen permeable membrane, which, say, is a 0.05 mm. thick palladium alloy membrane which has been stamped using a 100 mesh plain dutch weave wire netting, 2 and 2' are the convexities of said hydrogen permeable membrane, while 4 and 4' are the edges of the membrane, and 10 and 10' are the ribbonlike nickel sheets, say, of a thickness 0.2 mm. 30 is the supporting plate of 18 chromium steel, say, of a thickness 0.3 mm. whose surface has been plated with nickel. 20 is the pure hydrogen take-out tube which communicates with the spaces 5 and 5' formed between the supporting plate 30 and the hydrogen permeable membranes 1 and 1'.

The perimetric edge 6 of the superposed unit comprising the membranes and ribbon like nickel sheets is united integrally by welding, whereas the supporting 30 and the convexities 2 and 2' of the hydrogen permeable membranes are united by diffusion welding.

In the case of the invention hydrogen permeating assemblies, which have been specifically illustrated in FIGS. 7–A to 9–C, the following advantages accrue as a result of having overlaid the edges of the membranes and the thin nickel sheets and then uniting them by welding and also uniting by diffusion welding of the convexities of membranes to each other or the convexities of the membrane with the nickel-plated supporting member having a specific linear coefficient of expansion.

(a) Even though the thickness of the palladium alloy membrane is thin, the weldability is very good, and thus since defects and distortions due to welding hardly occur, the portion of union of the membrane (the perimetric edge) is not cracked or damaged. Hence, no leakage occurs.

(b) The perimetric edge becomes an alloy containing nickel and palladium, and as a result demonstrate tremendous durability, not being corroded or weakened at at 400–500° C. by the $H_2$, $N_2$, $NH_3$ and $H_2$ contained in the material gas.

(c) Since the convexed portions of the hydrogen permeable membranes being firmly united to each other or the convexed portion of the membrane and the nickel-plated supporting member being firmly united at a temperature of 400–700° C., the durability of the permeable membrane is reinforced, and in addition the conductivity of heat is also uniformalized and improved. Futhermore, as the net-like groove surrounding the convexed portion of the hydrogen permeable membrane exists as such inside the assembly, the circulation of the pure hydrogen which has permeated the membrane is very excellent.

EXAMPLE 3

This example illustrated that the hydrogen permeating assembly of the invention shown in FIGS. 8–A to 8–C possesses an excellent capacity for producing pure hydrogen.

The hydrogen permeating assembly of FIG. 8–A, which was fabricated as hereinbefore described, was tested for leakage by applying soap water to the outlet of the pure hydrogen take-out tube 20 and application of a nitrogen pressure of 15 kg./cm.[2] at room temperature. No leakage occurred, and thus it was confirmed that there was no defects in permeating assembly as a whole.

This permeating assembly was then mounted in its cell, and bombed hydrogen (99.7%) and cracked ammonia gas of the following composition were used as the material gas.

| | Percent |
|---|---|
| Hydrogen content | 74.9 |
| Nitrogen content | 24.6 |
| Water content | 0.1 |
| Ammonia content | 0.4 |

The experiment was carried out under the following conditions: pressure applied to the primary side, 10 kg./cm.$^2$; pressure at the secondary side from which the hydrogen was to be taken out, normal atmospheric pressure; temperature to which the permeable membrane was heated, 450° C.±5° C. (impure gas purge range 40%), the experiment being conducted for 10 hours intermittently for 200 times. As a result, the following facts were confirmed.

The palladium alloy membrane and the perimetric edge welded portion demonstrated their strong resistance to pressure, heat and corrosion, there being no deformation, damage, flaws, cracks, corrosion, etc., in the palladium alloy membrane as well as the welded edge portion, and hence no leakage at all.

The purity and amount of the hydrogen permeated were as follows:

Dew point of the permeated pure hydrogen, ° C. __ −90
Purity of the permeated pure hydrogen, percent _____ 99.99999
Amount of pure hydrogen permeated per 1 cm.$^2$:
    Cracked ammonia gas, l./hr _____ 1.8
    Bombed hydrogen, l./hr _____ 3

Thus, the invention assembly has a very high permeating capacity. Further, it makes it possible to obtain hydrogen of exceedingly high purity.

We claim:

1. A hydrogen permeable membrane comprising a 0.3 mm. to 0.005 mm. thick membrane selected from the group consisting of palladium and palladium alloys, the surface of said membrane being of a stamped wavy dutch weave wire configuration corresponding to a surface of 20 to 200 meshes.

2. A hydrogen permeable membrane according to claim 1 wherein said metal is a three-element alloy of palladium, silver and gold.

3. A hydrogen peremable membrane according to claim 1 wherein said membrane is of a thickness from 0.1 mm. to 0.05 mm. and said membrane has a wavy configuration substantially coinciding with the surface of a plain dutch weave wire netting of 50 to 100 meshes.

4. A hydrogen permeable membrane according to claim 1 wherein said membrane is of a thickness from 0.05 mm. to 0.01 mm. and said membrane has a wavy configuration substantially coinciding with the surface of a plain dutch weave wire netting of 100 to 200 meshes.

5. A thin hydrogen permeating assembly comprising a pair of superposed hydrogen permeable membranes so disposed that the convexities thereof are in vis-a-vis relation to each other, said hydrogen permeable membrane consisting of a 0.3 mm. to 0.005 mm. thick membrane of a metal selected from the group consisting of palladium and palladium alloys, the surface of said membrane being of a stamped wavy dutch weave wire configuration corresponding to a surface of 20 to 200 meshes, a pair of thin ribbon-like nickel sheets disposed about the edges of said membranes such as to sandwich the latter, and a pure hydrogen take-out passage communicating with the interior formed by said pair of superposed membranes, said assembly being integrally united at its perimetric edge by welding, the corresponding convexities of said pair membranes facing each other being united by diffusion welding.

6. A hydrogen permeating assembly comprising (a) hydrogen permeable membranes, said hydrogen permeable membrane consisting of a 0.3 mm. to 0.005 mm. thick membrane of a metal selected from the group consisting of palladium and palladium alloys, the surface of said membrane being of a stamped wavy dutch weave wire configuration corresponding to a surface of 20 to 200 meshes, (b) a supporting member consisting of thin nickel-plated sheet of a heat-resistant alloy whose linear coefficient of expansion at 500° C. is less than 14×10$^{-6}$ (° C.)$^{-1}$, said membranes and said supporting member being disposed one on top of the other in a manner such that the convexities of the membrane faces the surface of the supporting member, (c) thin, ribbon-like nickel sheets overlaid on the edges of said superposed membranes, and (d) a pure hydrogen take-out port provided at the edge of said assembly communicating with the spaces formed by said membranes and supporting member, the perimetric edge of said assembly being united integrally by welding, the convexities of said membranes and the supporting member being united by diffusion welding.

7. A hydrogen permeating assembly according to claim 6 wherein said assembly is a combination of said supporting member and a single sheet of said hydrogen permeable membrane disposed on one side of said supporting member.

8. A hydrogen permeating assembly according to claim 6 wherein said assembly is a combination of said supporting member and two sheets of said hydrogen permeable membrane, one sheet each being disposed on each side of said supporting member.

9. A method of manufacturing a hydrogen permeable membrane of wavy configuration which comprises placing a 0.3 mm. to 0.005 mm. thick flat membrane of a metal selected from the group consisting of palladium and palladium alloys, atop a plain dutch weave wire netting of 20 to 200 meshes, said wire netting being fitted to a supporting member, thereafter stamping the surface of said flat membrane with said wire netting by compressing said flat membrane from above by means of a pressure medium selected from the group consisting of rubber, oil and water at a pressure of 100 to 450 kg./cm.$^2$, and recovering said stamped membrane by separating it from said wire netting.

References Cited

UNITED STATES PATENTS

| 3,155,467 | 11/1964 | Yamamoto et al. | 55—16 |
| 3,238,704 | 3/1966 | Straschil et al. | 55—158 |
| 3,336,730 | 8/1967 | McBride et al. | 55—16 |

FOREIGN PATENTS

| 969,673 | 9/1964 | Great Britain. |

OTHER REFERENCES

International Nickel Company, Inc., Technical Data Bulletin, "Monel for Industrial Screen and Filter Cloth Problems," pp. 1, 2, 7 and 13, 210–499.

REUBEN FRIEDMAN, Primary Examiner

C. N. HART, Assistant Examiner

U.S. Cl. X.R.

72—60